United States Patent Office 2,839,976
Patented June 24, 1958

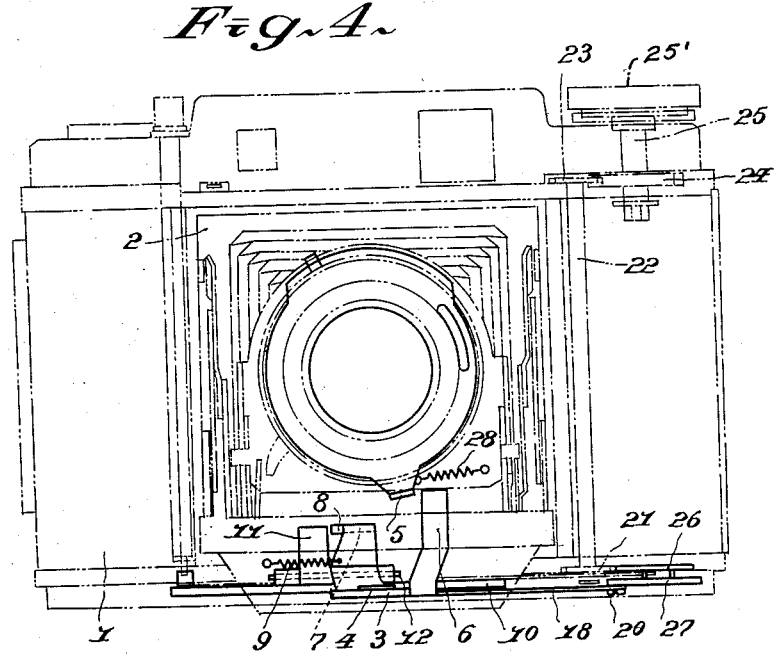

2,839,976

MECHANISM FOR SETTING SHUTTER BY FILM-WINDING OPERATION IN ROLLFILM CAMERA

Seiichi Mamiya, Bunkyo-ku, Tokyo-to, Japan

Application June 20, 1955, Serial No. 516,746

Claims priority, application Japan June 23, 1954

4 Claims. (Cl. 95—31)

This invention relates to a folding camera more particularly to an improved construction of a shutter setting mechanism operated by a film winding mechanism in a roll-film camera.

Heretofore shutter setting mechanisms have been interlocked with film winding mechanisms by a rigid structure, or constantly interengaged members, requiring an accurate setting on the film winding mechanism so that the shutter may be set as desired. Moreover, in known shutter setting mechanisms particularly those where the objective is carried or mounted on a cover the film-winding mechanism must be positioned properly so as to permit closing of the cover without damage to the shutter-operating mechanism. Accordingly, the interlocking mechanism between the film-winding mechanism makes it imperative that the latter mechanism be positioned accurately in an angular position so as to preclude the possibility of mispositioning the shutter setting mechanism so as to damage it when closing the cover.

It is an object of the present invention to provide an improved shutter setting mechanism eliminating the need of carefully and accurately setting the film-winding mechanism prior to closing the camera.

Another object is to provide a simple shutter setting mechanism actuated by the film-winding mechanism in which the shutter is set at the proper time to eliminate double exposures regardless of the initial setting of the film-winding mechanism.

Still another object is to provide a shutter setting mechanism adding greatly to the convenience of shutter operation without meticulous care by the camera operator as to the manner in which he handles the film-winding mechanism.

It is a feature of the invention that the shutter setting mechanism comprises a shutter setting lever constantly biased into an operative position. This lever is actuated by an operating plate operable by the film-winding mechanism and either the shutter setting lever or the operating plate carries a pivotally mounted member for interengaging both levers, and the pivotally mounted member permits a resilient interlocking structure so that the cover or bed carrying the objective may be closed regardless of the angular setting or position of the film-winding mechanism. Moreover, the shutter setting mechanism is releasably engaged by the pivotally mounted member when the shutter setting lever is in its initial operative position. The shutter setting lever is constantly returned or biased to the initial operating position once actuated, then released by the operating plate associated with the film-winding mechanism.

Other objects of the invention will be more fully understood from the following description and claims in conjunction with the accompanying drawings which illustrate, by way of example, a shutter setting mechanism constructed in accordance with the invention.

In the drawings:

Fig. 4 is a front view of the shutter setting mechanism shown in Figs. 2 and 3.

Figs. 5, 6 and 7 are views of modifications of the shutter setting lever and the engaging portion of the shutter operating plate in accordance with the invention.

Figure 2:
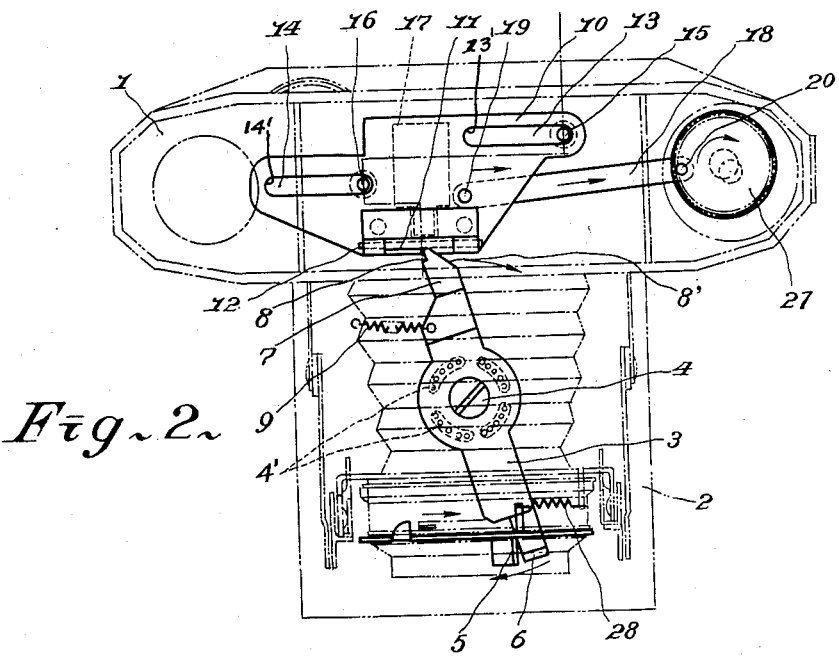
Fig. 2 is a plan view of a shutter setting mechanism and associated film-winding mechanism in accordance with the invention.
Figure 3:
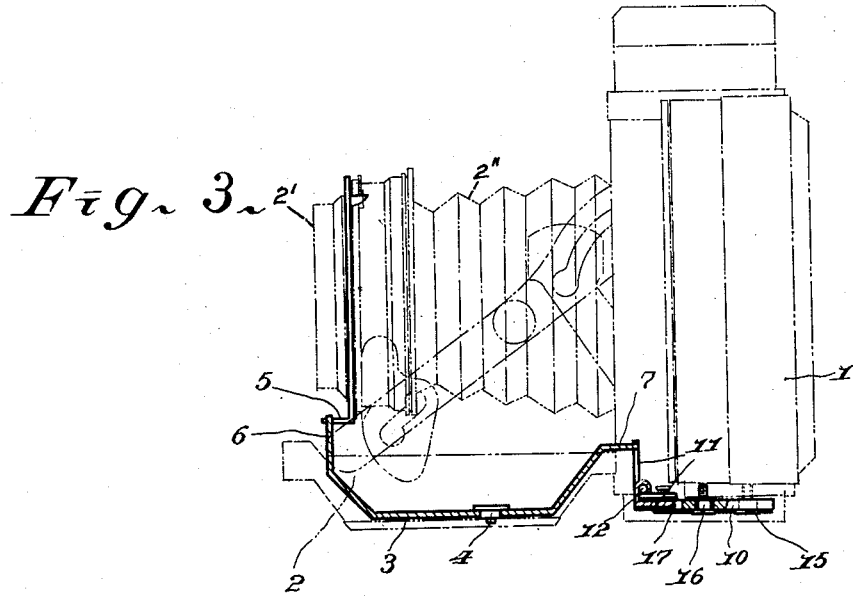
Fig. 3 is a side view of the shutter setting mechanism shown in Fig. 2.

The embodiment of the invention shown in Figs. 2, 3 and 4 has a camera body or case 1 with a bed or cover 2 pivotally connected to the case 1. An objective and associated shutter 2' connected to the camera body 1 by a bellows 2" is carried by the bed or cover 2. When the cover is opened in the manner shown in Fig. 3 the objective is placed in an operative or picture-taking position as well as the shutter setting mechanism in the manner to be discussed herein.

The cover 2 carries a pivotally mounted lever 3 mounted so as to rotate on pivot 4 with the lever easily rotatable on ball bearings 4'. The shutter setting lever 3 has an upwardly extending portion 6 engaging a shutter member 5 so as to set the shutter in the manner hereinafter disclosed. The lever 3 is bent upwardly to conform to the configuration of the cover 2 and is provided with a horizontal portion 7 having a notch 8 and a beveled edge 8' at the end opposite portion 6. The lever 3 is constantly biased into an operative or initial starting position by a spring 9 (Fig. 2) as shown.

The camera case 1 is provided with a slidably mounted operating plate 10 slidable longitudinally on the bottom of the camera case 1. The plate 10 is provided with two longitudinal slots 13 and 14 being engaged by pins 15 and 16, respectively, which are mounted upright on the bottom of the camera body 1 as shown. The operating plate 10 is provided with an L-shaped driving lug or piece 11 pivotally mounted on a shaft 12 which is supported pivotally by the plate 10. The driving lug 11 is normally held in an upright position for instance (Fig. 3) by a plate or leaf spring 17 constantly biasing a portion of the L-shaped lever 11 into an upright position. The lug 11 is rotatable in a clockwise direction (Fig. 3) when pushed against the spring force of spring 17. The spring 17 is fixed to plate 10 and is positioned between plate 10 and the bottom surface of the camera case. The lug piece 11 and the horizontal portion 7 of lever 3 are designed so that the lug may engage lever 3 at notch 8 upon opening of the front cover 2. A connecting lever or link 18 is pivotally connected to the operating plate 10 at one end thereof by a pivot 19 and to a rotatably mounted wheel 27 at its other end by an eccentric pivot or pin 20. The wheel 27 is fixed to a gear 26 so as to be rotated therewith. The gear 26 is positioned so as to constantly mesh with a gear 21 which is rotated by means of a shaft 22 operably connected to a gear 23 engaging another gear 24 rotated by a shaft 25 comprising a film-winding or film-advancing member. The camera is provided with a film-winding knob or wheel 25' external of the case 1 and fixed to shaft 25.

The operation of the shutter setting mechanism is as follows:

When the operator rotates the knob 25' to wind the film for an exposure shaft 25 and gear 24 affixed thereon are rotated so as to rotate gear 23 and shaft 22 rotates gear 21 which in turn rotates gear 26 and wheel 27 fixed thereto. Since pivot 20 is eccentrically connected to wheel 27 which is rotating in a clockwise direction the connecting lever 18 is moved to the right (Fig. 2) carrying the operating plate 10 in the same direction. The operating lever 10 slides from a normal rest position to the right to an operative position in a direction for setting the shutter until the pins 15 and 16 abut against the ends 13' and 14' of the longitudinal slots 13 and 14. It will readily be seen that as the operating plate moves, it carries along with it lug 11 which engages the notch 8 of shutter setting lever 3 moving it in a clockwise direction so that the lever portion 6 engages the shutter operating member 5 moving it in a clockwise direction so as to set the shutter. It will be understood that as operating plate 10 moves, as indicated heretofore, during the cycle of operation the lever 3 is eventually disengaged from lug 11 and is rotated in a counterclockwise direction by spring 9 so as to position the lever 3 again in an initial operative or starting position. Continued rotation of the film-winding mechanism operating member or lever 10 in the opposite direction, whereby the lug 11 which lies in the path of the portion 7 of lever 3 engages the beveled surface 8' deflecting the upright portion of lug 11 by rotating it on shaft or pin 12 against the action of spring 17. When the lever 3 is biased into an operative position, a spring 28 returns the shutter setting member 5 to the right or into an operative position or ready position for the next successive setting.

It will be understood that the various members of the shutter setting mechanism and film-winding mechanism are designed so that when a film is properly set for exposure the horizontal portion 7 of shutter setting lever 3 is in proper engagement with lug piece 11 so that the cover 2 may be closed once the film has been set for a subsequent exposure. However, it can readily be seen that even though the film-winding mechanism is not accurately positioned the horizontal portion of lever 3 will engage lug 11 and deflect it in a clockwise direction (Fig. 3) against the action of spring 17 and the cover 2 is accordingly closed without damaging any of the structure. Moreover, since the lever is constantly biased into an operative position the film-winding mechanism must be rotated so as to properly position the film for a subsequent exposure before lever portion 7 and lug 11 are in proper enagement so as to set the shutter. Thus it is quite apparent that double exposures are completely eliminated. It will be understood that the movement of operating plate 10 is such that it moves in both directions, to the right and to the left at each film setting thereby completing a cycle at each setting.

Figure 1:
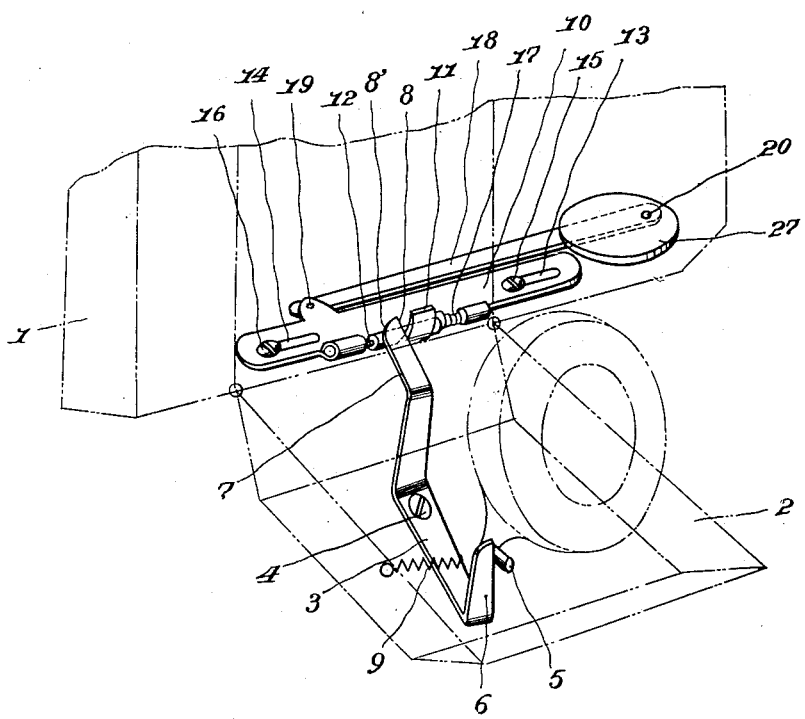
Fig. 1 is a perspective view of an embodiment of the shutter setting mechanism in accordance with the invention.

Referring to Fig. 1, it will be seen that the shutter setting member 5 may be positioned on the opposite side shown in Fig. 4 with the lever 3 biased in a clockwise direction as against a counterclockwise direction in Fig. 4. Since the lug 11 now moves the lever 3 in a direction opposite that shown in Fig. 4 to effect the shutter setting, the lever 3 is provided with an arcuate surface 8' permitting the same deflecting movement of lug 11 as heretofore discussed against the action of a spring 17. The cooperation of the mechanism is the same with the exception of the fact that the directions are reversed.

Many changes and modifications can be made in the shutter setting lever 3 as for example the driving lug 11 supported by slidable operating plate 10 and the driven portion 7 of lever 3 may be embodied as shown in Figs. 5, 6 and 7. In the example shown in Fig. 5, the driven portion 7 of lever 3 is pivotally mounted on lever 3 by pin 7' and biased in a downward direction by a spring 7" so as to be normally maintained in the position shown. In this embodiment the lug 11 is provided with an arcuate rand 11'. Since the driven portion 7 is biased in a downward direction it is constantly in the path of lug 11. When plate 10 is moved the lug 10 engages the portion 7 rotating the lever 3 in a clockwise direction. However, on the backward movement of operating lever 10, the arcuate surfaces 11' engage driven portion 7 and deflect it upwardly against the action of the spring 7" and once the operating plage 10 has moved completely to the left the portion 7 clears the arcuate rand and is moved downwardly by spring 7" so as to be in operative position for the next cycle. Accordingly, the lever 3 is constantly in readiness in an initial operating position.

In the embodiment in Fig. 6 lever 3 is provided with the driven portion 8 pivotally mounted at a pivot 29 with a spring 30 constantly biasing the driven portion in a clockwise direction so as to keep the portion 7 in the path of operating lug 11. The portion 7 is provided with bevel edge 8' so that on the return or backward movement of operating lug 11 the portion 7 is engaged by the lug 11 on the bevel surface 8' and is deflected in a counterclockwise direction eventually permitting the lug 11 to move past lever 3, as heretofore, and once clear the driven portion 7 is biased back in a clockwise direction and into an operative position.

In the embodiment of the shutter operating lever shown in Fig. 7 the driven piece or portion 7 is formed as a slidable member having longitudinal slots 31 wherein are engaged pins 32 fixed to lever 3, whereby said piece 7 is slidably attached to the lever 3. The driven portion 7 is biased in a longitudinal direction so as to tend to extend lever 3 by a spring 34 and is thus kept in constant engagement with driving lug 11. The driven portion 7 is provided with a slant surface 8', the configuration of which is such as to cause the portion 7 to move in a longitudinal direction against the action of the spring when lever 11 engages the surface 8' on its return movement. Accordingly, the lever 3 operates in a substantially similar manner as heretofore shown.

While a preferred embodiment of the invention has been illustrated and described, it will be understood that the invention is in no way limited to this embodiment and that many changes may be made within the spirit and scope of the invention as defined by the following claims.

I claim:

1. In a rollfilm camera, a camera case having a hinged cover which supports in its open position a photographic objective and a shutter of the setting type in a picture-taking position, a manually operable film-winding mechanism for advancing and positioning the film for successive exposures, a shutter-setting lever pivotally mounted on said cover for selectively setting the shutter as a function of the advancing of the film for successive exposures, means constantly biasing the shutter-setting lever toward an initial starting position thereby to restore the shutter-setting lever to said starting position subsequent to setting the shutter, means comprising a reciprocable first operating member operatively connected with the film-winding mechanism and reciprocable by said film-winding mechanism between a normal rest position and an operative position in a direction for engaging and pivotally actuating said shutter-setting lever in a direction for setting the shutter as a function of a film-advancing operation, means comprising deflectable means for operatively connecting said first operating member and said shutter-setting lever and arranged in an operative position so that said first member releasably engages and pivotally actuates the shutter-setting lever and releases it subsequently to setting the shutter during the travel of said operating member in said direction for setting the shutter and adapted to releasably engage the first operating member with the shutter-setting lever so that said lever is actuated in a direction for setting the shutter when said first operating member is substantially in its rest position prior to being reciprocated by said film-winding mechanism, said deflectable means being adapted to be deflected from its operative position upon return travel of the first operating member to its rest position thereby to allow the first operating member to assume its rest position upon the reciprocation thereof, and said shutter including a shutter-setting member disposed in an operative position in the path of said shutter-setting lever and restored to its operative-position between successive shutter-setting operations so as to be actuated by said shutter-setting lever when pivotally actuated by said first operating member in a direction for setting the shutter.

2. In a rollfilm camera, a camera case having a hinged cover which supports in its open position a photographic objective and a shutter of the setting type in a picture-taking position, a manually operable film-winding mechanism for advancing and positioning the film for successive exposures, a shutter-setting lever pivotally mounted on said cover for selectively setting the shutter as a function of the advancing and positioning of the film for successive exposures, means constantly biasing the shutter-setting lever toward an initial starting position thereby to restore the shutter-setting lever to said starting position subsequent to setting the shutter, means comprising a reciprocable operating plate operatively connected with the film-winding mechanism and reciprocable by said film-winding mechanism between a rest position and an operative position in a direction for selectively engaging and actuating said shutter-setting lever in a direction for setting the shutter as a function of a film-advancing operation, said operating plate having deflectable means for releasably engaging and pivotally actuating the shutter-setting lever and subsequently releasing it after setting the shutter during the travel of said operating plate in said direction for setting the shutter, and said shutter-setting lever having an end portion disposed in the path of said deflectable means and provided with surfaces cooperating therewith and arranged to releasably engage the deflectable means so as to be actuated in a direction for setting the shutter when said operating plate is in substantially its rest position prior to being reciprocated by said film-winding mechanism and having surfaces adapted for deflecting said deflectable means upon return travel of the operating plate to its rest position thereby to allow the operating plate to assume its rest position during the reciprocation thereof.

3. In a rollfilm camera according to claim 2, in which said deflectable means comprises a pivotally mounted lug carried by said operating plate, means constantly biasing the lug into an operative position for engaging the shutter-setting lever and adapted to allow deflection of the lug in a direction corresponding to the direction of closure of said cover, whereby the cover is closable without damage regardless of the relative position of said end portion of the shutter-setting lever and the lug and regardless of the position of said film-winding mechanism.

4. In a rollfilm camera, a camera case having a hinged cover which supports in its open position a photographic objective and a shutter of the setting type in a picture-taking position, a manually operable film-winding mechanism for advancing and positioning the film for successive exposures, a shutter-setting lever pivotally mounted on said cover for selectively setting the shutter as a function of the advancing of the film for successive exposures, means constantly biasing the shutter-setting lever toward an initial starting position thereby to restore the shutter-setting lever to said starting position subsequent to setting the shutter, means comprising a reciprocable first operating member operatively connected with the film-winding mechanism and reciprocable by said film-winding mechanism between a normal rest position and an operative position in a direction for engaging and pivotally actuating said shutter-setting lever in a direction for setting the shutter as a function of a film-advancing operation, means comprising deflectable means for operatively connecting said first operating member and said shutter-setting lever and arranged in an operative position on an end of said lever in the path of said first operating member so that said first member releasably engages and pivotally actuates the shutter-setting lever and subsequently releases it after setting the shutter during the travel of said operating member in said direction for setting the shutter and adapted to releasably engage the first operating member with the shutter-setting lever so that said lever is actuated in a direction for setting the shutter when said first operating member is substantially in its rest position prior to being reciprocated by said film-winding mechanism, said deflectable means being adapted to be deflected from its operative position upon return travel of the first operating member to its rest position thereby to allow the first operating member to assume its rest position upon the reciprocation thereof, and said shutter including a shutter-setting member disposed in an operative position in the path of said shutter-setting lever and restored to its operative position between successive shutter-setting operations so as to be actuated by said shutter-setting lever when pivotally actuated by said first operating member.

References Cited in the file of this patent

UNITED STATES PATENTS

| | | |
|---|---|---|
| 2,237,887 | Nerwin | Apr. 8, 1941 |
| 2,478,394 | Harvey | Aug. 9, 1949 |

FOREIGN PATENTS

| | | |
|---|---|---|
| 696,101 | Great Britain | Aug. 26, 1953 |
| 912,048 | Germany | May 24, 1954 |